US008289468B2

United States Patent
Tanaka

(10) Patent No.: US 8,289,468 B2
(45) Date of Patent: Oct. 16, 2012

(54) LIQUID CRYSTAL MODULE

(75) Inventor: Kazuya Tanaka, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 591 days.

(21) Appl. No.: 12/575,563

(22) Filed: Oct. 8, 2009

(65) Prior Publication Data

US 2010/0149451 A1    Jun. 17, 2010

(30) Foreign Application Priority Data

Dec. 11, 2008    (JP) .................................. 2008-315663

(51) Int. Cl.
*G02F 1/1333*    (2006.01)
(52) U.S. Cl. ................................ 349/58; 349/61; 349/65
(58) Field of Classification Search ................ 349/58–65
See application file for complete search history.

(56) References Cited

U.S. PATENT DOCUMENTS

| 7,760,286 B2 * | 7/2010 | Sudo ............................ 349/58 |
| 2007/0008687 A1 | 1/2007 | Fukuda |

FOREIGN PATENT DOCUMENTS

| JP | 2006-350218 A | 12/2006 |
| JP | 2007-17835 A | 1/2007 |
| JP | 2007-298670 A | 11/2007 |
| JP | 2007-304279 A | 11/2007 |

* cited by examiner

*Primary Examiner* — Richard Kim
*Assistant Examiner* — David Chung
(74) *Attorney, Agent, or Firm* — Global IP Counselors

(57) ABSTRACT

A liquid crystal module includes a rear frame, a light source, an optical sheet, a liquid crystal panel and a bezel. The bezel includes first and second bezel pieces. The first bezel piece has a first recess portion and a first tab portion that protrudes from a first bottom portion of the first recess portion toward the second bezel pieces. The second bezel piece has a second recess portion and a second tab portion that protrudes from a second bottom portion of the second recess portion toward the first bezel pieces. The first bottom portion and the first tab portion of the first bezel piece are superposed with the second tab portion and the second bottom portion of the second bezel piece, respectively.

12 Claims, 4 Drawing Sheets

LIQUID CRYSTAL MODULE

CROSS-REFERENCE TO RELATED APPLICATIONS

This application claims priority to Japanese Patent Application No. 2008-315663, filed on Dec. 11, 2008. The entire disclosure of Japanese Patent Application No. 2008-315663 is hereby incorporated herein by reference.

BACKGROUND OF THE INVENTION

1. Field of the Invention

The present invention generally relates to a liquid crystal module. More specifically, the present invention relates to a liquid crystal module having a bezel.

2. Background Information

A conventional directly-backlit type of liquid crystal module has a basic structure in which a light source is disposed inside of a rear frame, an optical sheet and a liquid crystal panel are disposed in front of the light source, and a bezel with a rectangular frame shape is fitted to four sides of the liquid crystal panel and screwed to the rear frame.

The bezel that fixes the liquid crystal panel is formed by either linking four bezel constituent frame pieces (hereinafter "bezel pieces") in a rectangular frame shape, or linking two L-shaped bezel pieces in a rectangular frame shape. Stepped linking tabs are formed by bending at the ends of the bezel pieces, and the linking tabs are superposed with and screwed to the linking tabs or the ends of the other bezel pieces (see Japanese Laid-Open Patent Application Nos. 2007-304279, 2006-350218 and 2007-17835, for example).

However, when the linking tabs are formed by bending at the ends of the bezel pieces, and the bezel pieces are linked into a rectangular frame shape, the bezel can be deformed because the linking tabs are not strong enough.

This problem with inadequate strength of the linking tabs can be solved to a certain degree by making the bezel pieces thicker, or by reducing the amount that the linking tabs protrude. Nevertheless, if the bezel pieces are made thicker, this greatly increases both weight and cost. Furthermore, since holes are usually formed in the linking tabs for inserting screws or for inserting positioning bosses, there is a limit to how much the protruding distance of the linking tabs can be reduced.

Also, when the bezel pieces that have the linking tabs formed at their ends are linked into a rectangular frame shape, the bezel thus assembled does not have a very good appearance, and there is room for improvement from an aesthetic standpoint.

In view of the above, it will be apparent to those skilled in the art from this disclosure that there exists a need for an improved liquid crystal module. This invention addresses this need in the art as well as other needs, which will become apparent to those skilled in the art from this disclosure.

SUMMARY OF THE INVENTION

The present invention was conceived in light of the above-mentioned problems. One object of the present invention is to provide a liquid crystal module with which there is less risk of deformation of a bezel, and with which the bezel is also improved aesthetically.

In accordance with one aspect of the present invention, a liquid crystal module includes a rear frame, a light source, an optical sheet, a liquid crystal panel and a bezel. The light source is disposed inside of the rear frame. The optical sheet is disposed above the light source. The liquid crystal panel is disposed above the optical sheet. The bezel has a rectangular frame shape and is disposed on a peripheral edge portion of the liquid crystal panel to hold the liquid crystal panel relative to the rear frame. The bezel includes first and second bezel pieces that are linked together to form the bezel and fixedly coupled to the rear frame with at least one screw. The first bezel piece has a first recess portion that is formed on an end portion of the first bezel piece and opens toward the second bezel piece and a first tab portion that protrudes from a first bottom portion of the first recess portion toward the second bezel piece. The second bezel piece has a second recess portion that is formed on an end portion of the second bezel piece and opens toward the first bezel piece and a second tab portion that protrudes from a second bottom portion of the second recess portion toward the first bezel piece. The first bottom portion and the first tab portion of the first bezel piece are superposed with the second tab portion and the second bottom portion of the second bezel piece, respectively.

With the liquid crystal module of the present invention, it is possible to provide a liquid crystal module with which there is less risk of deformation of a bezel, and with which the bezel is also improved aesthetically.

These and other objects, features, aspects and advantages of the present invention will become apparent to those skilled in the art from the following detailed descriptions, which, taken in conjunction with the annexed drawings, disclose a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENT

A preferred embodiment of the present invention will now be explained with reference to the drawings. It will be apparent to those skilled in the art from these disclosures that the following descriptions of the preferred embodiment of the present invention are provided for illustration only and not for the purpose of limiting the invention as defined by the appended claims and their equivalents.

Figure 1:
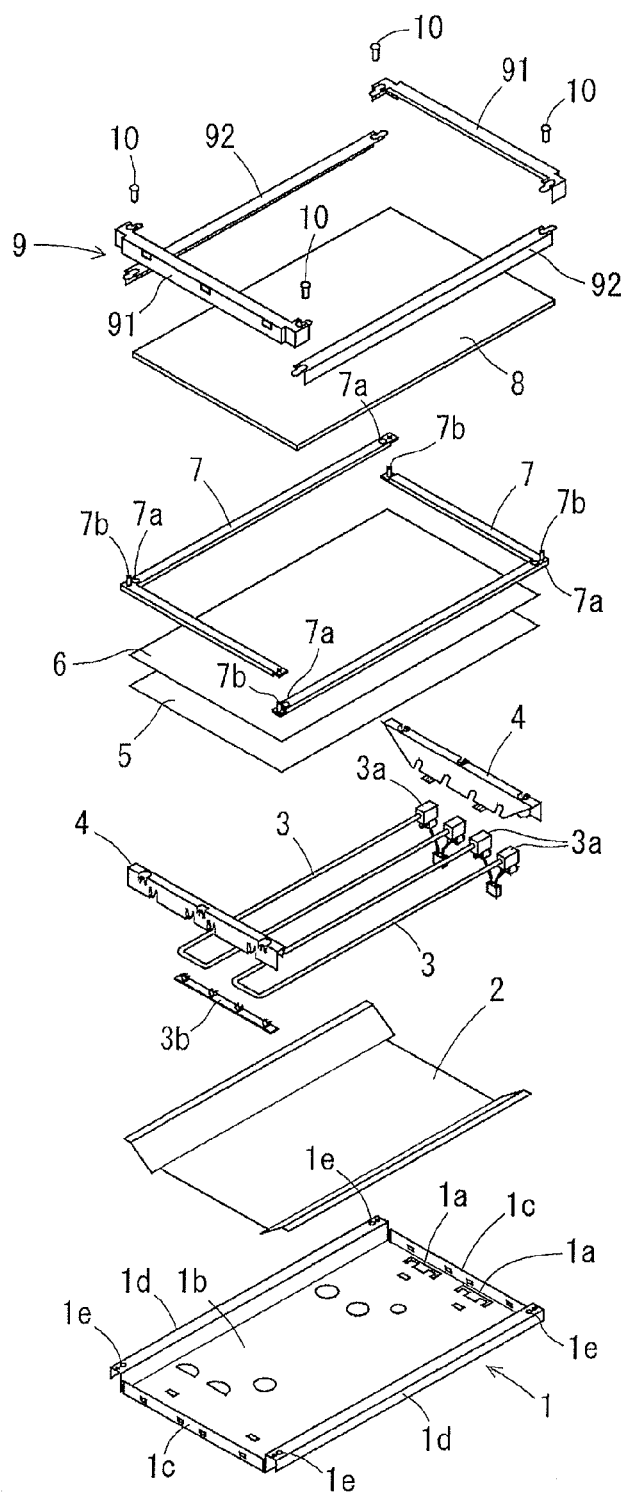
FIG. 1 is an exploded perspective view of a liquid crystal module in accordance with one embodiment of the present invention.
Figure 2:
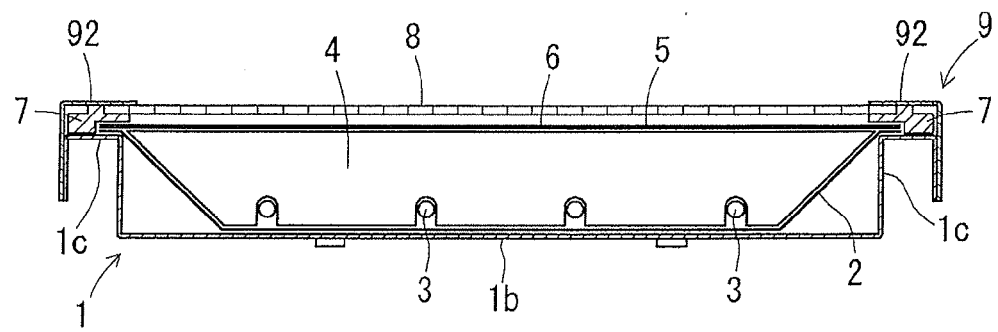
FIG. 2 is a cross sectional view of the liquid crystal module illustrated in FIG. 1.

As shown in FIGS. 1 and 2, a liquid crystal module includes a rear frame 1, a light reflecting sheet 2, a plurality of (two, for example) U-shaped cold cathode tubes (e.g., light sources) 3, a pair of left and right lamp frames 4, a light reflecting sheet (e.g., optical sheet) 5, a prism sheet (e.g., optical sheet) 6, a pair of L-shaped plastic frames (e.g., retainer frame) 7, a liquid crystal panel (e.g., liquid crystal cell) 8, a bezel 9 and four bezel fixing screws (e.g., screws) 10.

The liquid crystal module is disposed into a television set, a personal computer, or another such electronic device.

The rear frame 1 is made of sheet metal. The light reflecting sheet 2 is disposed inside of the rear frame 1. The light reflecting sheet 2 is bent into an inverse trapezoidal shape. The U-shaped cold cathode tubes 3 are disposed as a light source above the light reflecting sheet 2 inside of the rear frame 1. The U-shaped cold cathode tubes 3 are attached to the rear frame 1 by fitting lamp sockets 3a disposed at end portions of the U-shaped cold cathode tubes 3 into groove-like openings 1a formed in a bottom plate 1b of the rear frame 1 such that lead wires of the U-shaped cold cathode tubes 3 extend through the openings 1a behind the rear frame 1, and fixing a bent portion of each of the U-shaped cold cathode tubes 3 that is bent in a U shape to the bottom plate 1b of the rear frame 1 with a lamp holder 3b. The left and right lamp frames 4 are attached inside of left and right side plates 1c of the rear frame 1, respectively. The left and right lamp frames 4 cover the lamp sockets 3a and the lamp holder 3b of the cold cathode tubes 3.

The light reflecting sheet 5 and the prism sheet 6 are disposed one over the other as optical sheets. The light reflecting sheet 5 and the prism sheet 6 are disposed above the cold cathode tubes 3. Peripheral edges of the light reflecting sheet 5 and the prism sheet 6 are placed on the left and right lamp frames 4 and a pair of side plates 1d of the rear frame 1 with a two-wall constriction, and held down by the plastic frames (e.g., cell guides) 7 from above. The plastic frames 7 include four screw insertion holes 7a and four bezel positioning bosses (e.g., positioning bosses) 7b at four corners of the plastic frames 7 when the plastic frames 7 are combined in a rectangular frame shape. The screws 10 are inserted into the screw insertion holes 7a, respectively. Furthermore, four bezel fixing screw holes (e.g., screw holes) 1e are formed at the end portions of side plates 1d of the rear frame 1.

Four peripheral edges of the liquid crystal panel 8 are placed over the plastic frames 7. The liquid crystal panel 8 is disposed above the light reflecting sheet 5 and the prism sheet 6. The bezel 9 is fitted to the peripheral edges (e.g., peripheral edge portion) of the liquid crystal panel 8. The bezel 9 has a rectangular frame shape. The bezel 9 includes a pair of short bezel constituent frame pieces (e.g., first and third bezel pieces) 91 (hereinafter "short bezel pieces 91") and a pair of long bezel constituent frame pieces (e.g., second and fourth bezel pieces) 92 (hereinafter "long bezel pieces 92") that are linked together in a rectangular frame shape. The short bezel pieces 91 are identical to each other, and the long bezel pieces 92 are identical to each other. Each of the short bezel pieces 91 is integrally formed as a one-piece, unitary member. Each of the long bezel pieces 92 is integrally formed as a one-piece, unitary member. The bezel 9 is fixedly coupled to the end portions of the side plates 1d of the rear frame 1 by the screws 10, thereby completing the integral assembly of the liquid crystal module.

Figure 3:
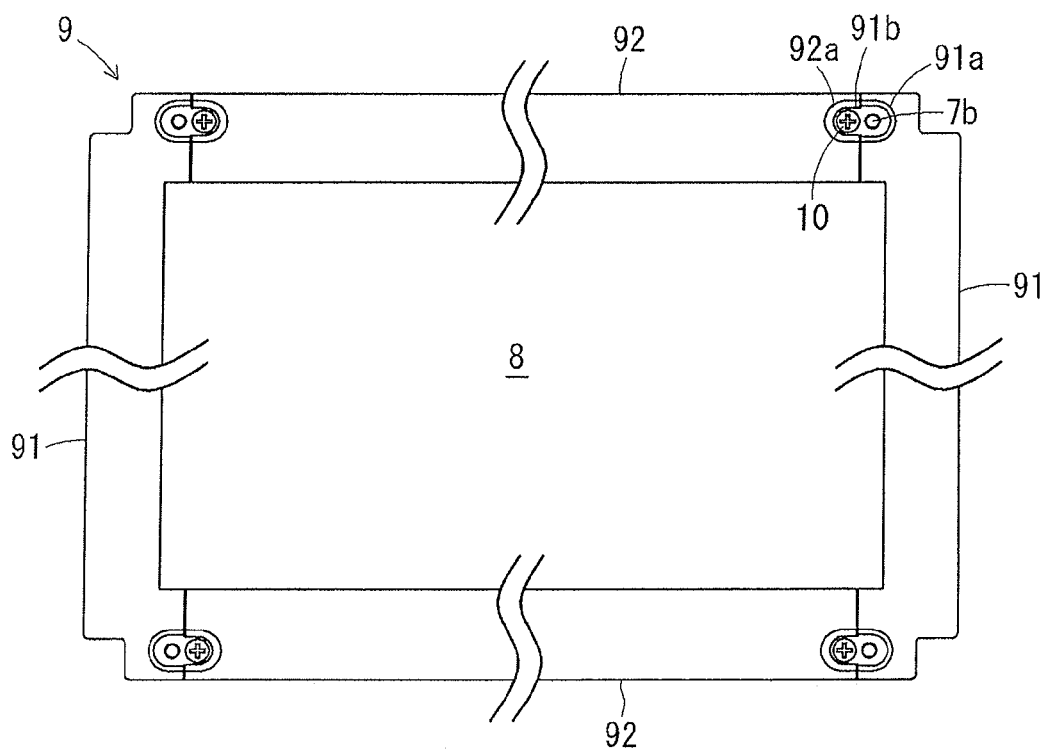
FIG. 3 is a front elevational view of a bezel of the liquid crystal module illustrated in FIG. 1.
Figure 4:
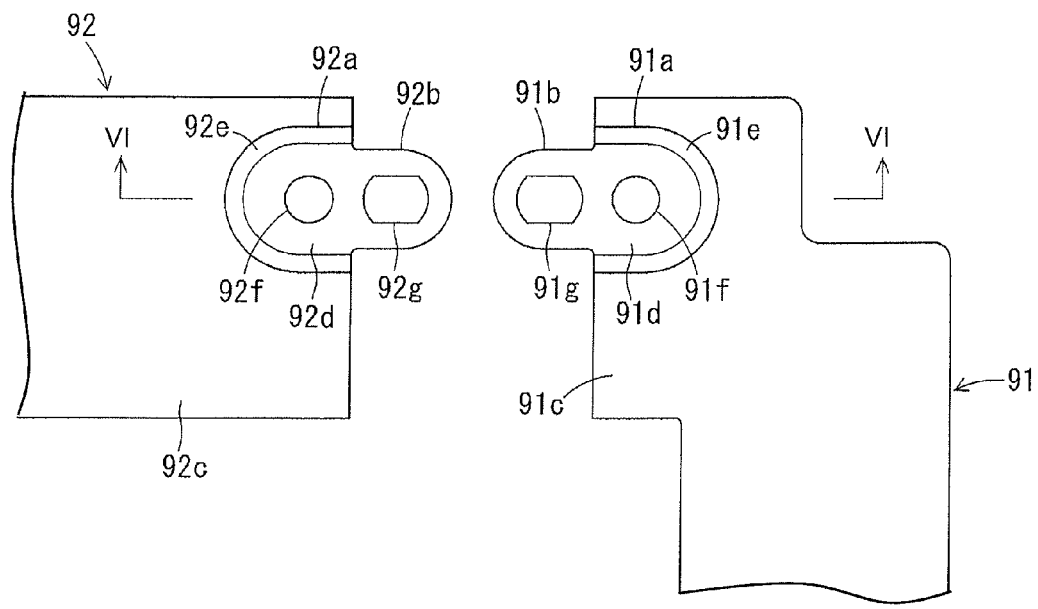
FIG. 4 is a detailed exploded front elevational view of a linked portion of the bezel.
Figure 6:
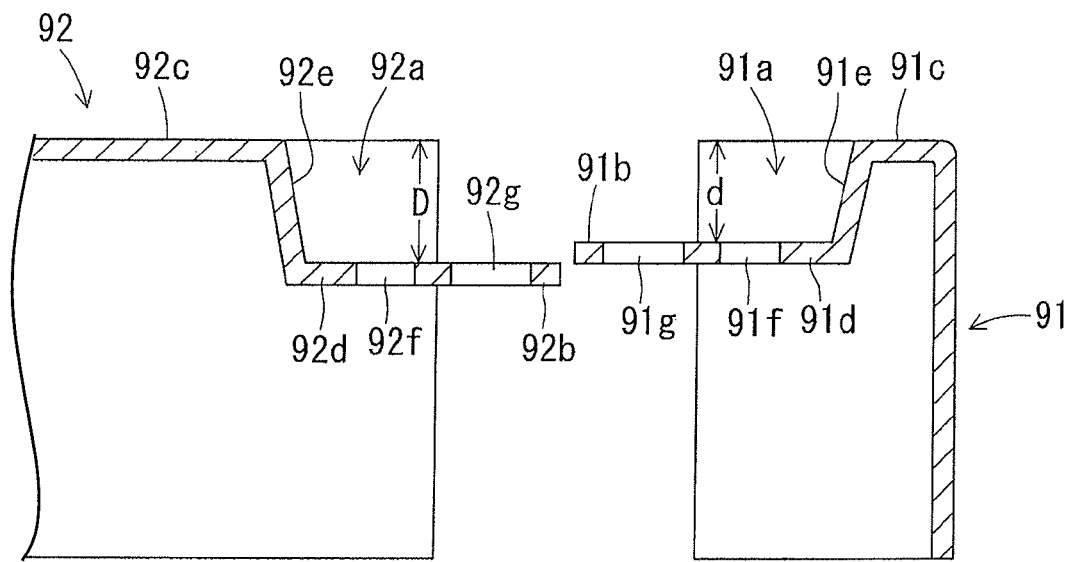
FIG. 6 is a detailed cross sectional view taken along VI-VI line in FIG. 4.

As shown in FIG. 3, the bezel 9 of the liquid crystal module links in a rectangular frame shape four bezel pieces 91 and 92 made of sheet metal. Each bezel piece 91 and 92 has a hook-shaped cross sectional view. As shown in FIGS. 1, 4 and 6, each of the short bezel pieces 91 includes two recesses (e.g., first recess portions or third recess portions) 91a that are formed at end portions of each of the short bezel pieces 91, respectively, and two tabs (e.g., first tab portions or third tab portions) 91b that are formed at the end portions of each of the short bezel pieces 91, respectively. Furthermore, each of the long bezel pieces 92 includes two recesses (e.g., second recess portions or fourth recess portions) 92a that are formed at end portions of each of the long bezel pieces 92, respectively, and two tabs (e.g., second tab portions or fourth tab portions) 92b that are formed at the end portions of each of the long bezel pieces 92, respectively.

The recesses 91a and 92a are as follows. The end portions of upper plates (front plates) 91c and 92c of the bezel pieces 91 and 92 are drawn to form recesses 91a and 92a having a semi-elliptical plan view shape that is open on the linking end side. In particular, the recesses 91a of the short bezel pieces open toward the long bezel pieces 92, and the recesses 92a of the long bezel pieces open toward the short bezel pieces 91. Each of the recesses 91a includes a bottom (e.g., first bottom portion or third bottom portion) 91d and a side face (e.g., first inclined side face) 91e, and each of the recesses 92a includes a bottom (e.g., second bottom portion or fourth bottom portion) 92d and a side face (e.g., second inclined side face) 91e. As shown in FIG. 6, the depth of the recess 91a is set to be smaller than the depth D of the recess 92a by an amount equal to the thickness of the bottom 91d of the recess 91a. The side faces (e.g., first and second inclined side faces or inside faces) 91e and 92e of the recesses 91a and 92a are upwardly expanding tapered faces or slanted faces. In other words, the side faces 91e and 92e extend upward and outward relative to the bottoms 91d and 92d, respectively. More specifically, the side faces 91e and 92e of the semicircular portions of the recesses 91a and 92a are formed as upwardly expanding tapered faces, and the side faces 91e and 92e of the straight portions extending from the semicircular portions to the open end are formed as upwardly expanding slanted faces.

The tabs 91b and 92b are provided protruding outward from the bottoms 91d and 92d of the recesses 91a and 92a, respectively. Specifically, the tabs 91b of the short bezel pieces 91 protrude from the bottoms 91d toward the long bezel pieces 92, respectively, and the tabs 92b of the long bezel pieces 92 protrude from the bottoms 92d toward the short bezel pieces 91, respectively. The tabs 91b are formed in a semi-elliptical shape and of a size that fits into the bottoms 92d of the recesses 92a, respectively. The tabs 92b are formed in a semi-elliptical shape and of the same size as the tabs 91b. Furthermore, the tabs 92b are formed in a semi-elliptical shape and of the size corresponding to the bottoms 91d of the recesses 91a, respectively. Thus, the recesses 91a and 92a and the tabs 91b and 92b are located at four corners of the bezel.

Figure 5:
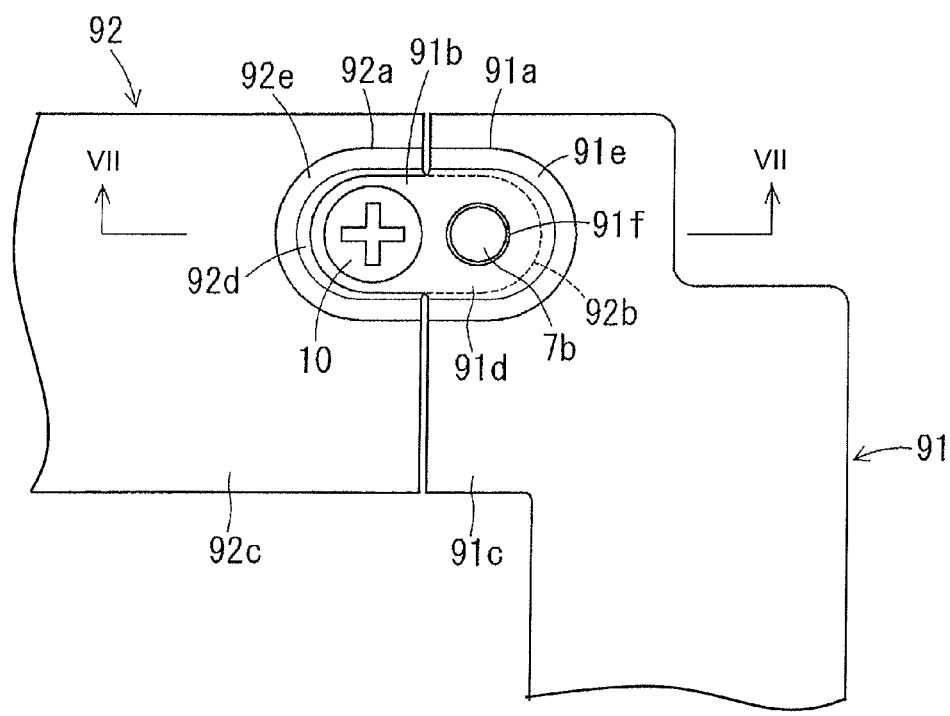
FIG. 5 is a detailed front elevational view of the linked portion of the bezel.
Figure 7:
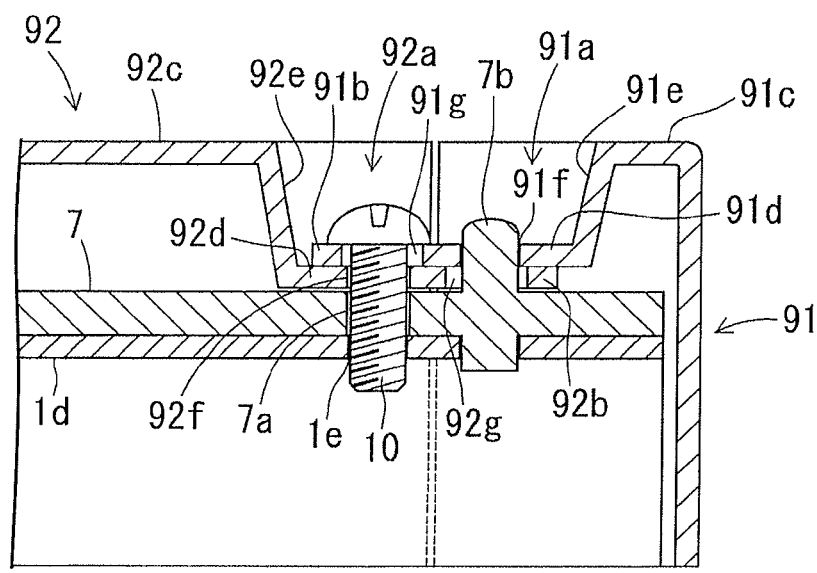
FIG. 7 is a detailed cross sectional view taken along VII-VII line in FIG. 5.

The bezel pieces 91 and 92 further include round holes (e.g., circular holes) 91f and 92f and slots 91g and 92g, respectively. The round holes 91f and 92f are respectively formed in the bottoms 91d and 92d of the recesses 91a and 92a. The slots 91g and 92g are respectively formed in the tabs 91b and 92b that protrude from the bottoms 91d and 92d, respectively. The slots 91g and 92g are formed in an oval shape, and longer in a horizontal direction. Furthermore, the slots 91g and 92g are larger in both horizontal and vertical directions than the rounded holes 91f and 92f. As shown in FIGS. 5 and 7, the round holes 91f and 92f and slots 91g and 92g serve as screw insertion holes for inserting the screws 10 and as boss insertion holes for inserting the positioning bosses 7b.

As shown in FIG. 3, the bezel 9 of the liquid crystal module is such that the bezel pieces 91 and 92 are disposed in a rectangular frame shape along the four peripheral edges of the liquid crystal panel 8. Furthermore, as shown in FIGS. 5 and 7, the bottom 91d of the recess 91a and the tab 91b of the short bezel piece 91 are superposed with the tab 92b and the bottom 92d of the recess 92a of the long bezel piece 92. The bosses 7b of the plastic frames 7 are inserted in the slots 92g of the tabs 92b and the round holes 91f of the recesses 91a from below, which positions the bezel pieces 91 and 92 relative to the plastic frames 7. Furthermore, the slots 91g of the tabs 91b, the round holes 92f of the recesses 92a and the screw insertion holes 7a of the plastic frames 7 are aligned, respectively. Then, the screws 10 are disposed through the slots 91g of the tabs 91b, the round holes 92f of the recesses 92a and the screw insertion holes 7a of the plastic frames 7 from above, respectively, and are threaded into the screw holes 1e of the side plates 1d of the rear frame 1. Accordingly, the bezel pieces 91 and 92 of the bezel 9 are fixedly coupled to the rear frame 1 with the screw 10 at the same time as being assembled in a rectangular frame shape.

With the liquid crystal module, the semi-elliptical recesses 91a and 92a that are open on the linking end side are formed by drawing at the end portions of the bezel pieces 91 and 92. The tabs 91b and 92b are provided protruding outward from the bottoms 91d and 92d of the recesses 91a and 92a. The slots 91g and 92g that serve as the screw insertion holes or boss insertion holes are formed on the tabs 91b and 92b. The round holes 91f and 92f that serve as the screw insertion holes or boss insertion holes are formed on the bottoms 91d and 92d of the recesses 91a and 92a. The bottoms 91d of the recesses 91a and the tabs 91b of the short bezel pieces 91 are superposed with the bottoms 92d of the recesses 92a and the tabs 92b of the long bezel pieces 92 that are linked together with the short bezel pieces 91, and the bezel pieces 91 and 92 are fixed to the rear frame 1 with the screws 10. Thus, the distance that the tabs 91b and 92b protrude is reduced to about half that of conventional tabs with two holes (screw insertion holes and boss insertion holes). Accordingly, the tabs 91b and 92b become stronger. Furthermore, the bottoms 91d and 92d of the drawn recesses 91a and 92a are strong, undergoing substantially no deformation or sag. Furthermore, this, coupled with the fact that the protruding distance of the tabs 91b and 92b is short and the strength is high as mentioned above, means that there is virtually no risk that the tabs 91b and 92b that protrude integrally from the bottoms 91d and 92d of the recesses 91a and 92a will deform or sag. Accordingly, the corners of the bezel 9 can be securely linked. Also, since the protruding distance of the tabs 91b and 92b is shortened, the developed surface area of the bezel pieces 91 and 92 is correspondingly smaller. Accordingly, the amount of sheet metal material that is used can be reduced, and this lowers the cost.

Also, when the bezel pieces 91 and 92 have been linked and the bezel 9 is assembled as discussed above, the semi-elliptical recesses 91a and 92a that are open on the linking end side fit together and form an elliptical depression. Furthermore, the depressions of the recesses 91a and 92a house the screw heads of the screws 10 and the distal ends of the positioning bosses 7b. Thus, the linked portions of the bezel pieces 91 and 92 have a neater appearance, which improves aesthetics.

Moreover, the bezel 9 is such that the depth d of the recess 91a in the short bezel piece 91 is smaller than the depth D of the recess 92a of the long bezel piece 92 by the amount equal to the thickness of the bottom 91d of the recess 91a. Thus, as shown in FIG. 7, the bezel pieces 91 and 92 will be linked such that the surfaces of the upper plates 91c and 92c at the end portions of the bezel pieces 91 and 92 are flush and are located in the same plane. Thus, this gives the linked portions of the bezel pieces 91 and 92 an even better appearance.

Also, the side faces 91e and 92e of the recesses 91a and 92a of the bezel pieces 91 and 92 include upwardly expanding tapered faces or slanted faces, respectively. Thus, when the tab 91b of the short bezel piece 91 is superposed on the bottom 92d of the long bezel piece 92, the tab 91b will be guided down to the bottom 92d by the side face 92e of the recess 92a. Furthermore, the slots 91g and 92g are formed on the tabs 91b and 92b, respectively. Thus, the spacing between the ends of the bezel pieces 91 and 92 that are linked together can be finely adjusted, which greatly facilitates the work involved.

With the liquid crystal module, the semi-elliptical recesses 91a and 92a that are open on the linking end side are formed at the end portions of the bezel pieces 91 and 92, and the semi-elliptical tabs 91b and 92b protrude from the bottoms 91d and 92d. However, the shape of the recesses 91a and 92a and the tabs 91b and 92b is not limited to this. For example, square recesses that are open on the linking end side can be formed on the end portions of the bezel pieces 91 and 92, and square tabs that fit into the recesses can extend from the bottoms of the recesses of the bezel pieces 91 and 92.

Also, with the liquid crystal module, the round holes 91f and 92f are formed in the bottoms 91d and 92d of the recesses 91a and 92a, and the slots 91g and 92g are formed in the tabs 91b and 92b. However, the situation can be reversed. For example, the slots 91g and 92g can be formed in the bottoms 91d and 92d of the recesses 91a and 92a, and the round holes 91f and 92f can be formed in the tabs 91b and 92b.

Furthermore, the depth d of the recesses 91a of the short bezel pieces 91 is set to be smaller than the depth D of the recesses 92a of the long bezel piece 92. However, the situation can be reversed. For example, the depth D of the recesses 92a of the long bezel pieces 92 can be set to be smaller than the depth d of the recesses 91a of the short bezel pieces 91, and the bottoms 92d and the tabs 92b of the recesses 92a can be superposed on the tabs 91b and the bottoms 91d of the recesses 91a, respectively.

With the liquid crystal module, the bezel 9 includes two short bezel pieces 91 and two long bezel pieces 92 that are separately formed. However, the bezel 9 can include a pair of first and second L-shaped bezel pieces. Each of the first and second L-shaped bezel pieces is integrally formed as a one-piece, unitary member, and has a short side portion and a long side portion. Furthermore, the recesses 91a and the tabs 91b are formed on the short side portions of the first and second L-shaped bezel pieces, and the recesses 92a and the tabs 92b are formed on the long side portions of the first and second L-shaped bezel pieces. Then, the short side portion of the first L-shaped bezel piece is linked with the long side portion of the second L-shaped bezel, and the short side portion of the second L-shaped bezel piece is linked with the long side portion of the first L-shaped bezel. Moreover, the bezel 9 can include one short bezel piece that is identical to the short bezel piece 91 and one U-shape bezel piece component in which two long bezel pieces that are identical to the long bezel pieces 92 and one short bezel piece that is identical to the short bezel piece 92 are integrally formed as one-piece, unitary member. Then, the short bezel piece is linked to the U-shape bezel piece component with the linking structure described above at two end portions of the short bezel piece. Furthermore, the bezel 9 can include one long bezel piece that is identical to the long bezel piece 92 and one U-shape bezel piece component in which two short bezel pieces that are identical to the short bezel pieces 91 and one long bezel piece that is identical to the long bezel piece 91 are integrally formed as one-piece, unitary member. Then, the long bezel piece is linked to the U-shape bezel piece component with the linking structure described above at two end portions of the long bezel piece.

GENERAL INTERPRETATION OF TERMS

In understanding the scope of the present invention, the term "comprising" and its derivatives, as used herein, are intended to be open ended terms that specify the presence of the stated features, elements, components and groups, but do not exclude the presence of other unstated features, elements, components and groups. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a liquid crystal module equipped with the present invention. Accordingly, these terms, as utilized to describe the present invention should be interpreted relative to a liquid crystal module equipped with the present invention as used in the normal operating position.

While a preferred embodiment has been chosen to illustrate the present invention, it will be apparent to those skilled in the art from these disclosures that various changes and modifications can be made herein without departing from the scope of the invention as defined in the appended claims. Furthermore, the foregoing descriptions of the preferred embodiment according to the present invention are provided for illustration only, and not for the purpose of limiting the invention as defined by the appended claims and their equivalents.

What is claimed is:

1. A liquid crystal module comprising:
   a rear frame;
   a light source disposed inside of the rear frame;
   an optical sheet disposed above the light source;
   a liquid crystal panel disposed above the optical sheet; and
   a bezel having a rectangular frame shape and disposed on a peripheral edge portion of the liquid crystal panel to hold the liquid crystal panel relative to the rear frame, the bezel including first and second bezel pieces that are linked together to form the bezel and that are fixedly coupled to the rear frame with at least one screw,
   the first bezel piece having a first recess portion that is formed on an end portion of the first bezel piece and opens toward the second bezel piece and a first tab portion that protrudes from a first bottom portion of the first recess portion toward the second bezel piece, and
   the second bezel piece having a second recess portion that is formed on an end portion of the second bezel piece and opens toward the first bezel piece and a second tab portion that protrudes from a second bottom portion of the second recess portion toward the first bezel piece, with the first bottom portion and the first tab portion of the first bezel piece being superposed with the second tab portion and the second bottom portion of the second bezel piece, respectively.

2. The liquid crystal module according to claim 1, wherein a depth of the first recess portion of the first bezel piece is smaller than a depth of the second recess portion of the second bezel piece by an amount equal to a thickness of the first bottom portion of the first bezel piece.

3. The liquid crystal module according to claim 1, wherein the first and second recess portions of the first and second bezel pieces include first and second inclined side faces that extend upward and outward relative to the first and second bottom portions, respectively.

4. The liquid crystal module according to claim 2, wherein the first and second recess portions of the first and second bezel pieces include first and second inclined side faces that extend upward and outward relative to the first and second bottom portions, respectively.

5. The liquid crystal module according to claim 1, further comprising
   a retainer frame disposed between the optical sheet and the liquid crystal panel, the retainer frame having a positioning boss that is disposed through a first positioning hole of the first bottom portion and a second positioning hole of the second tab portion such that the first and second bezel pieces of the bezel are positioned relative to the retainer frame.

6. The liquid crystal module according to claim 5, wherein
   the first positioning hole of the first bottom portion includes a circular hole, and
   the second positioning hole of the second tab portion includes a slot.

7. The liquid crystal module according to claim 1, further comprising
   a retainer frame disposed between the optical sheet and the liquid crystal panel, the retainer frame having a screw insertion hole that is aligned with a first screw insertion hole of the first tab portion and a second screw insertion hole of the second bottom portion such that the first and second bezel pieces of the bezel are fixedly coupled to the rear frame with the at least one screw that is disposed through the first screw insertion hole of the first tab portion, the second screw insertion hole of the second bottom portion and the screw insertion hole of the retainer frame, and that is threaded into a screw hole of the rear frame.

8. The liquid crystal module according to claim 7, wherein
   the first screw insertion hole of the first tab portion includes a slot, and
   the second screw insertion hole of the second bottom portion includes a circular hole.

9. The liquid crystal module according to claim 1, wherein
   the bezel further includes third and fourth bezel pieces that are linked together to form the bezel and that are fixedly coupled to the rear frame with the at least one screw,
   the third bezel piece having a third recess portion that is formed on an end portion of the third bezel piece and opens toward the fourth bezel piece and a third tab portion that protrudes from a third bottom portion of the third recess portion toward the fourth bezel piece, and
   the fourth bezel piece having a fourth recess portion that is formed on an end portion of the fourth bezel piece and opens toward the third bezel piece and a fourth tab portion that protrudes from a fourth bottom portion of the fourth recess portion toward the third bezel piece, with the third bottom portion and the third tab portion of the third bezel piece being superposed with the fourth tab portion and the fourth bottom portion of the fourth bezel piece, respectively.

10. The liquid crystal module according to claim 9, wherein
    the first bezel piece is identical to the third bezel piece, and
    the second bezel piece is identical to the fourth bezel piece.

11. The liquid crystal module according to claim 10, wherein
    the first and third bezel pieces are linked to the second and fourth bezel pieces at four corners of the bezel.

12. The liquid crystal module according claim 1, wherein
    the first bezel piece is integrally formed as one-piece, unitary member in a L-shape as viewed from a front side of the liquid crystal module, and
    the second bezel piece is integrally formed as one-piece, unitary member in an L-shape as viewed from the front side of the liquid crystal module.

* * * * *